R. H. MARRIOTT.
PROTECTION APPARATUS FOR DYNAMO ELECTRIC MACHINES.
APPLICATION FILED NOV. 27, 1909.
978,607.
Patented Dec. 13, 1910.
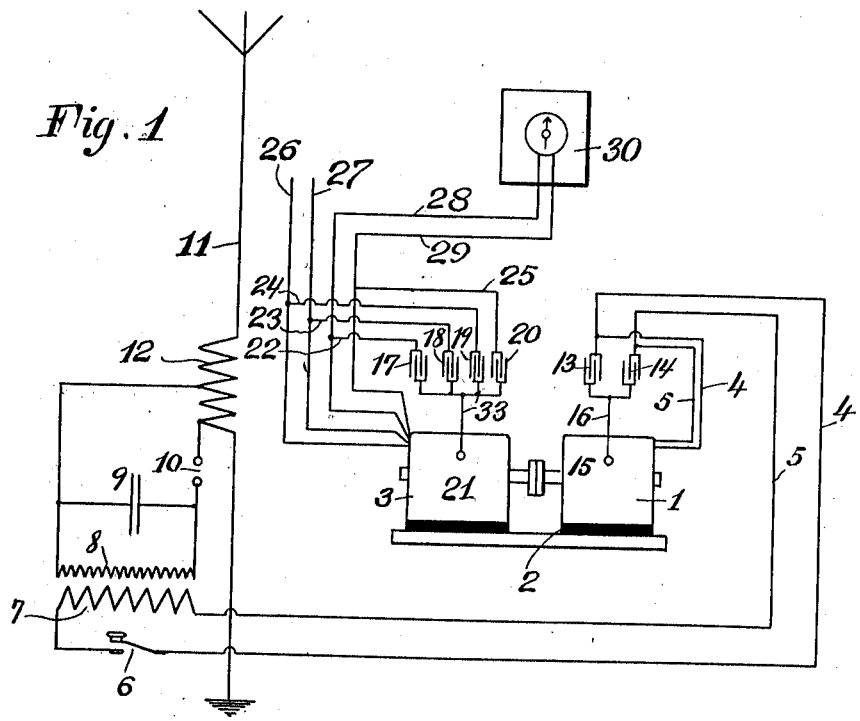
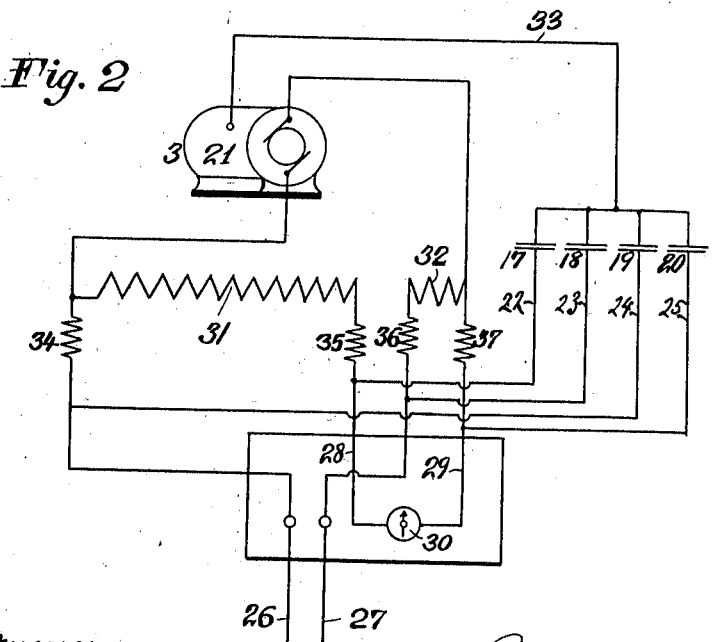

UNITED STATES PATENT OFFICE.

ROBERT H. MARRIOTT, OF BROOKLYN, NEW YORK, ASSIGNOR TO UNITED WIRELESS TELEGRAPH COMPANY, A CORPORATION OF MAINE.

PROTECTION APPARATUS FOR DYNAMO-ELECTRIC MACHINES.

978,607.   Specification of Letters Patent.   Patented Dec. 13, 1910.

Application filed November 27, 1909. Serial No. 530,076.

*To all whom it may concern:*

Be it known that I, ROBERT H. MARRIOTT, a citizen of the United States, and a resident of Brooklyn, Kings county, New York, have invented certain new and useful Improvements in Protection Apparatus for Dynamo-Electric Machines, of which the following is a specification.

In wireless telegraph stations, it is desirable to insulate the frame, and thus insulate the windings of the dynamo which supplies the charging current for the sending antennæ, and in case a motor generator is used, it is also desirable to insulate the frame and windings of the motor of the set. The frame of the motor and of the generator, when insulated, has an appreciable capacity in a high frequency circuit. If high frequency oscillations or waves strike the line wires of the dynamo or motor, these oscillations or waves will tend to set up electric oscillations in a circuit including the leads and the frame of the dynamo or motor. The electric oscillations may originate in the aerial, arranged near the machine and reach the machine through the leads connecting the windings to a regulating apparatus. In either case, they will tend to break down the insulation between the frame and the wires.

My invention relates to means for protecting electro-dynamic machinery from disruptive discharges caused by high frequency waves, and more particularly my invention relates to means for protecting such machinery from the influences of electric waves originated by a sending antenna, the charging current for which is supplied by the machine to be protected.

One of the objects of my invention is to provide a means for protecting the insulated frame of a dynamo electric machine and to prevent disruptive discharges in such a machine, by combining with the machine to be protected a condenser, one terminal of the condenser being connected to the machine frame, and the other to the windings of the machine.

Another object of my invention is to provide an easy path between the leads and the frame of the machine for the high frequency oscillations, this path being of such a nature that it will not allow a substantial amount of the current of the dynamo or motor to pass through it.

With the above and other objects in view, my invention consists in the parts, improvements and combinations more fully pointed out hereinafter.

Referring now to the drawings attached to this specification, and forming a part thereof: Figure 1 is a diagrammatic view of a motor generator set, the generator supplying the charging current to a local circuit having an antenna. Fig. 2 is a diagrammatic view, in which in addition to the condensers used in Fig. 1, a plurality of inductance coils are used, for the purpose of protecting the windings of the electro-dynamic machine.

The dynamo 1 is insulated at its base, as indicated at 2, and is driven by a motor 3. The dynamo and motor usually rest on the same insulated base. Suitable wires 4, 5 run from the dynamo through the key 6 and through the primary circuit 7 of a transformer, whose secondary is indicated at 8. The secondary of the transformer is connected to a local closed oscillatory circuit of a wireless telegraph transmitter, which circuit contains the condenser 9, and causes a spark to pass through the spark gap 10. This charges the antenna 11, which has an inductance 12 inserted therein for tuning purposes.

In accordance with my invention, I provide a plurality of condensers 13, 14, one coating of each condenser being connected to the frame 15 of the generator 1 by a wire 16. Each of the other coatings of the condensers 13, 14 are connected respectively to the wires 4 and 5, as indicated. By this means any high frequency waves or oscillations caused by the antenna circuit 11 sending out waves which are collected by the wires 4 and 5, or by any other action, are prevented from passing through the insulation of the windings in the dynamo 1 to the frame 15 through the wires 4 and 5. Instead of doing this, they pass through the condensers 13 and 14 to the frame 15, and the oscillations die down in the condenser circuit where they are absorbed. In accordance with my invention, I correspondingly protect the motor 3 by connecting one coating of a plurality of condensers 17, 18, 19, 20 to the frame 21 of the motor 3, which frame is likewise insulated, and by connecting the other coatings of the condensers by wires 22, 23, 24, 25 to the leading-in wires 26 and 27, supplying current to the motor, and to the wires 28, 29 connecting the starting rheostat 30 mounted on the switchboard with the motor.

Referring now to Fig. 2, the motor 3 with insulated frame 21 is of the usual compound type, having a shunt winding 31, and a series winding 32. One coating of the condensers 17, 18, 19 and 20 is connected to the leading-in wires 26, 27, which supply the current, and to the wires 28, 29, which connect the starting rheostat 30 with the motor. The other coating of the condensers 17, 18, 19 and 20 is connected to the frame of the machine by wire 33. The starting rheostat 30 is arranged in series with the fields as usual. A plurality of inductances 34, 35, 36 and 37 are inserted in series with the windings and assist in keeping out the high frequency oscillations.

Having thus described my invention, its operation will be apparent. The high frequency oscillations which might otherwise enter the windings of the machine and discharge to the frame are kept out by the condensers and the inductances, as illustrated.

Having thus described my invention, what I claim as new, and desire to secure by Letters Patent, is:

1. The combination of a generator, an aerial, a local closed oscillatory circuit including a spark gap, a condenser and an inductance, a transformer for supplying energy to said local circuit, wire leads leading from the generator to said transformer, said aerial and local circuit being in such proximity to and relation with the wiring of said generator that high frequency oscillations are produced in said wiring by the wave action of said oscillatory circuit, and a condenser, one terminal of the condenser being connected to the generator frame and the other to the wire leads between the transformer and the generator.

2. The combination of a motor, a generator driven thereby, an aerial, a local closed oscillatory circuit including a spark gap, a condeser and an inductance, a transformer for supplying energy to said local circuit, wire leads leading from the generator to said transformer, wire leads supplying current to said motor, said aerial and local circuit being in such proximity to and relation with the wiring of said generator and motor that high frequency oscillations are produced in said wiring by the wave action of said oscillatory circuit and a plurality of condensers, one terminal of a condenser being connected to the frame of the generator and another terminal to the wire leads between the generator and transformer, and a plurality of condensers for protecting the motor, one terminal of the condensers being connected to the motor frame, the other terminals of the condensers being respectively connected to the leads for supplying the motor with current.

3. The combination of an aerial, a local closed oscillatory circuit including a spark gap, a condenser and an inductance, a transformer for supplying energy to said local circuit, a dynamo, a motor for driving said dynamo, a switch-board, a rheostat located on said switch-board, wires connecting said rheostat with the armature of said motor, the aerial and local circuit being adjacent to the wiring of the generator and a condenser, one plate of said condenser being connected to one of the wires leading from the rheostat and the other plate being connected to the frame of the motor.

4. The combination of an electro-dynamic machine, including a frame, an armature and a field, a switchboard, a rheostat located on said switchboard, wires connecting said rheostat with said armature, and a condenser, one plate of said condenser being connected to one of said wires leading from the rheostat, and the other plate being connected to the frame of the machine.

In testimony whereof, I have signed my name to this specification, in the presence of two subscribing witnesses.

ROBERT H. MARRIOTT.

Witnesses:
W. C. Margeson,
D. Harold Bush.